July 22, 1941.  R. MARSLAND  2,249,843

LUBRICATION APPARATUS

Filed April 23, 1940  2 Sheets-Sheet 1

INVENTOR
ROLAND MARSLAND, DECEASED,
BY MAUD L. MARSLAND, EXECUTRIX.
BY
a. B. Reavis
ATTORNEY

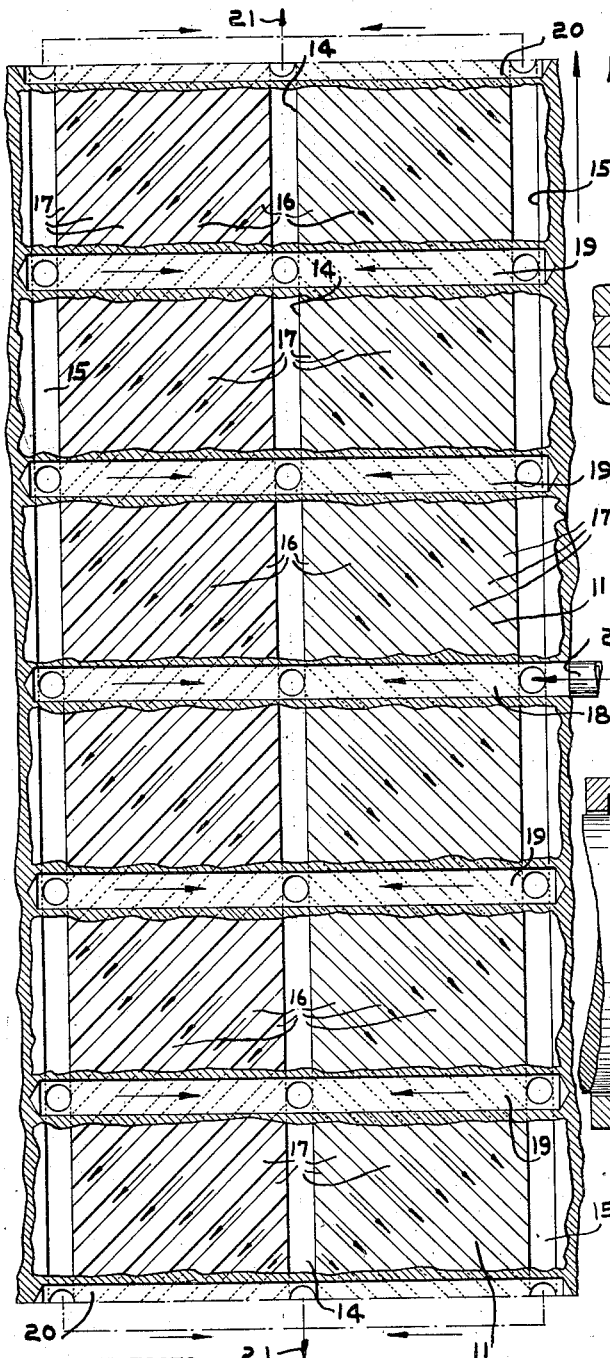
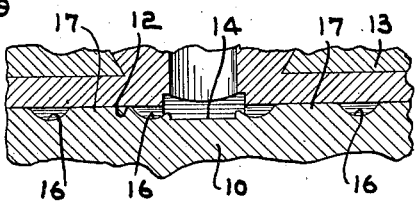
Fig. 3.
Fig. 4.
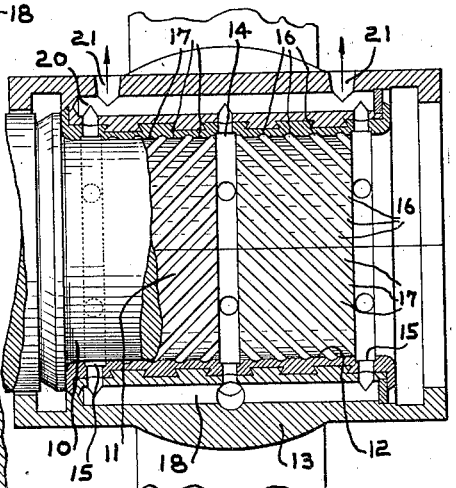
Fig. 5.
INVENTOR
ROLAND MARSLAND, DECEASED,
BY MAUD L. MARSLAND, EXECUTRIX.
BY
A. B. Reavis
ATTORNEY Patented July 22, 1941

2,249,843

UNITED STATES PATENT OFFICE 2,249,843

LUBRICATION APPARATUS

Roland Marsland, deceased, late of Moylan, Pa., by Maud Lois Marsland, executrix, Moylan, Pa., assignor to Westinghouse Electric & Manufacturing Company, East Pittsburgh, Pa., a corporation of Pennsylvania Application April 23, 1940, Serial No. 331,204

3 Claims. (Cl. 308—122)

The invention relates to lubrication of a journal bearing by means of viscosity pumping devices forming part of the bearing and it has for an object to provide apparatus of this character which is effective irrespective of the direction of rotation.

This and other objects are effected by the invention as will be apparent from the following description and claims taken in connection with the accompanying drawings, forming a part of this application, in which:

Fig. 3 is a development view illustrating the principle of operation;

Fig. 4 is a sectional detail view; and,

Fig. 5 is a view similar to Fig. 1, but showing a modified construction.

Figure 1:
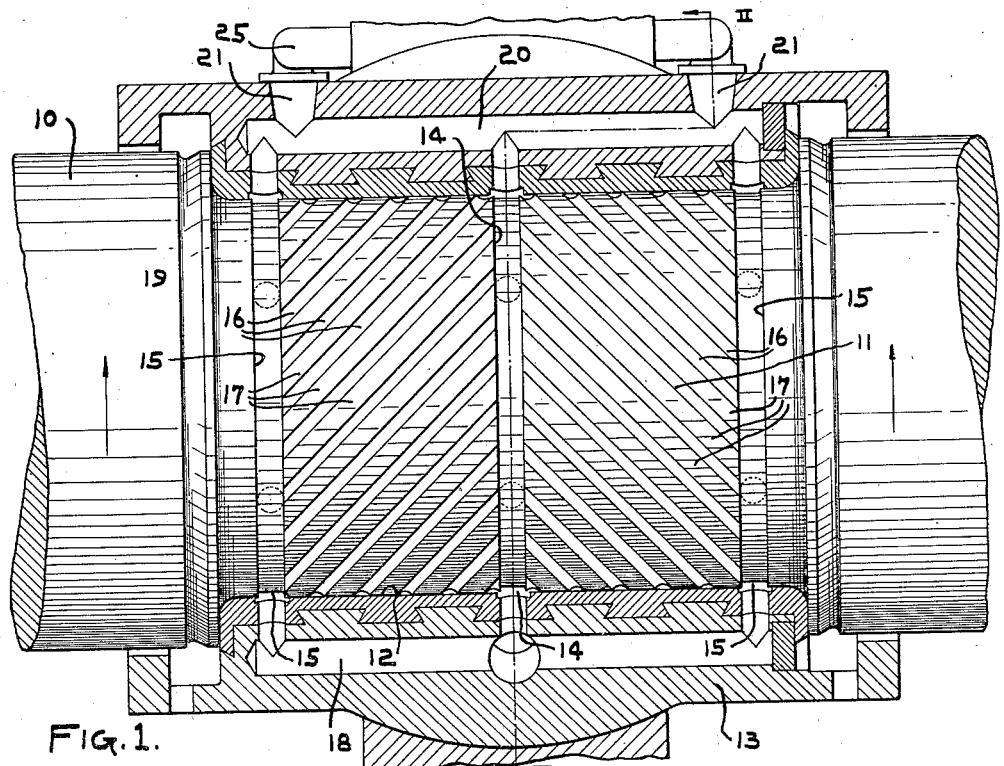
Fig. 1 is a longitudinal sectional view of a journal bearing having the improved lubricating features applied thereto.

In the drawings, there is shown a shaft 10 having a journal portion 11 fitting the cylindrical bearing portion 12 of the bearing housing 13.

One or both of the journal and bearing portions 11 and 12 are formed with an intermediate annular channel 14 and outer annular channels 15. Preferably, these annular channels are formed partly in the bearing portion and partly in the journal portion.

The intermediate annular channel 14 is connected by oppositely-inclined helical grooves 16 to the outer channels 15, the helical grooves being formed either in the journal portion or in the bearing portion. As shown in Figs. 1 to 4, inclusive, the grooves 16 are formed in the journal portion, while, in Fig. 5, the grooves are formed in the bearing portion. The grooves are spaced by lands 17 providing the cylindrical bearing surface for the portion having the grooves.

The bearing housing 13 has cross passages 18, 19—19 and 20 affording communication between the intermediate channel 14 and the outer channels 15, the cross passages being distributed circumferentially of the bearing. The bearing housing has an inlet passage 22 communicating with the cross passage 18 and with outlet passages 21 communicating with the diametrically-opposed cross passage 20.

Lubricating oil is supplied in any suitable manner to the inlet passage 22 and is discharged from the outlet passages. With a horizontal bearing having the cross passage 18 at the bottom and the diametrically-opposed cross passage 20 at the top, lubricating oil may be supplied from a gravity-feed reservoir 23 connected by a conduit 24 to the inlet passage 22 and the discharge passages 21 are preferably connected by conduits 25 for returning oil to the reservoir.

Figure 2:
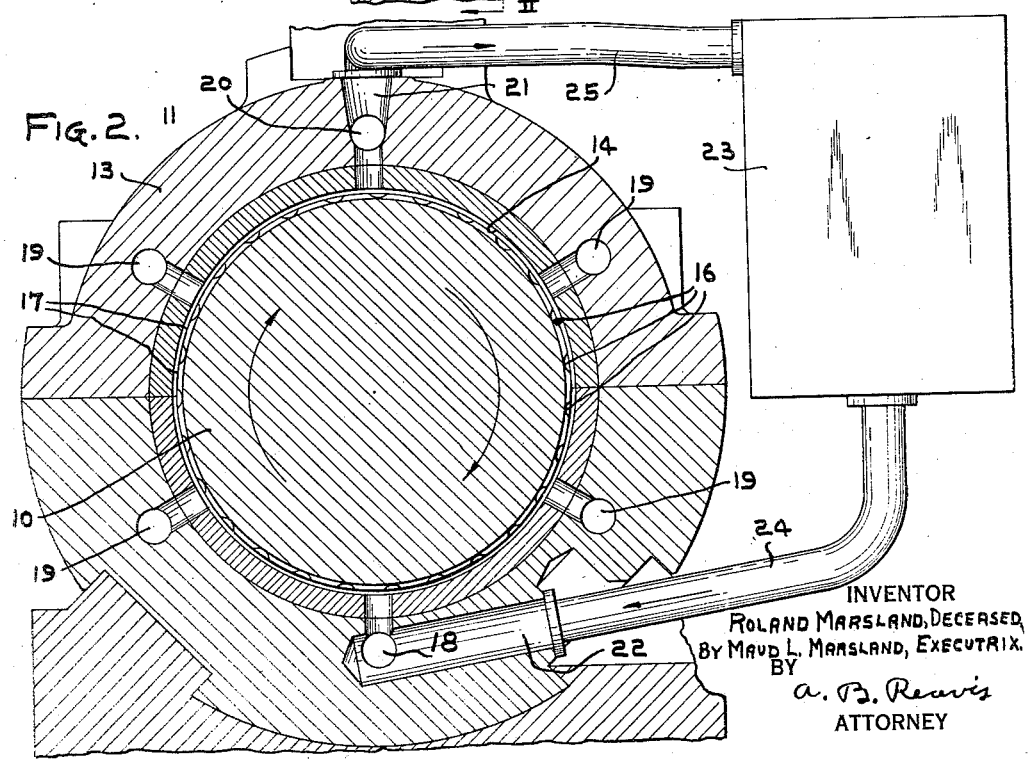
Fig. 2 is a transverse sectional view taken along the line II—II of Fig. 1.

Assuming that the direction of rotation is that indicated in Figs. 1, 2 and 3, and that lubricating oil is supplied to the cross passage 18, then due to the viscosity pumping effect of the helical grooves 16, oil will be supplied from the cross passage 18 to the intermediate annular channel 14 and pumped from the latter to the outer channels 15 by the viscosity pumping devices. Thus, with this direction of rotation, the intermediate channel may be regarded as a suction channel and the outer channels 15 as discharge channels. Oil accumulating in the outer channels 15 is returned by the cross passages 19—19 to the intermediate channel, whereby the oil may be recirculated by the viscosity pumping devices as it traverses the bearing from the inlet cross passage 18 to the discharge cross passage 20.

With the construction described, it is assured that the entire bearing shall be adequately lubricated. If lubricating oil is supplied to the bottom cross passage 18 and the intermediate channel 14 is functioning as the suction channel, then the viscosity pumping devices provide for pumping of oil from the channel 14 to the outer channels 15 and the latter channels, as well as the channel 14, may be completely filled due to this pumping effect irrespective of the extent of submergence of the bottom portion of the intermediate channel 14, the cross passages 19 providing for return of oil from the outer channels to the intermediate channel. Thus, with the arrangement of annular channels and cross passages, the viscosity pumping devices assure of the channels being maintained filled with oil so that the helical grooves may be effective as viscosity pumping elements for the full circumference of the bearing. Not only do the grooves function with the cooperating bearing surface to provide for viscosity pumping due to frictional effects, but this action assures of the maintenance of adequate lubricating oil films between the land bearing surface elements and the opposed bearing surface.

If the direction of rotation of the journal is reversed, then the directions of flow in the bearing will be reversed, the outer annular channels 15 then becoming the suction channels and the intermediate channel 14 the discharge channel.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a lubricating journal bearing, a bearing housing having a bearing portion and a shaft having a journal portion fitting the bearing portion, one or both of said portions having annular channels formed intermediate of the length of and at the outer ends of said portions, one of said portions having oppositely-inclined helical grooves formed therein and connecting the intermediate channel to the outer channels, said bearing housing having passages distributed thereabout and affording communication between the outer channels and the intermediate channel, and said bearing housing having lubricant inlet and outlet passages communicating with said channels.

2. The combination as claimed in claim 1 wherein the bearing is horizontal with the lubricant inlet passage at the bottom of the bearing and the outlet passage at the top thereof.

3. In a lubricating journal bearing, a bearing housing having a bearing portion and a shaft having a journal portion fitting the bearing portion, one or both of said portions having annular channels formed intermediately of the length of and at the outer ends of said portions, one of said portions having oppositely-inclined helical grooves connecting the intermediate channel with the outer channels, said bearing housing having cross passages distributed circumferentially thereof and affording communication between the outer channels and the intermediate channel, said bearing housing having lubricant inlet passages communicating with one of the cross passages and lubricant outlet passages communicating with the diametrically-opposed cross passage.

MAUD LOIS MARSLAND,
*Executrix of the Estate of Roland Marsland, Deceased.*